US006166618A

United States Patent [19]

Robertson et al.

[11] Patent Number: 6,166,618

[45] Date of Patent: Dec. 26, 2000

[54] ELECTRICAL SAFETY RECEPTACLE

[75] Inventors: James W. Robertson; Harry M. Capper, both of Harrisburg, Pa.; Deborah Laun, Syracuse, N.Y.; Kurt Werner, Auburn, N.Y.; David Middleton; Howard S. Ryan, both of Skaneateles, N.Y.

[73] Assignee: The Whitaker Corporation, Wilmington, Del.

[21] Appl. No.: 09/301,269

[22] Filed: Apr. 28, 1999

Related U.S. Application Data

[60] Provisional application No. 60/118,229, Feb. 2, 1999.

[51] Int. Cl.[7] .......................... H01H 37/04; H01H 85/143; H02H 5/04

[52] U.S. Cl. .......................... 337/380; 337/381; 337/260; 337/266; 337/376; 439/621; 361/105; 307/86; 340/652

[58] Field of Search .......................... 337/381, 380, 337/255–257, 260, 1–13, 35, 36, 197, 198, 79, 241, 242, 265, 266, 332, 376; 439/621, 622, 511, 188, 911, 488–490, 924.1; 361/55, 56, 103–105, 77, 111, 118, 119, 92, 93; 307/86, 93, 92; 340/652, 656

[56] References Cited

U.S. PATENT DOCUMENTS

| | | | |
|---|---|---|---|
| 1,945,672 | 2/1934 | Adams et al. | 337/198 |
| 2,597,600 | 5/1952 | Shapiro | 439/651 |
| 2,636,096 | 4/1953 | Di Blasi | 337/189 |
| 4,330,167 | 5/1982 | Chien-Tung | 339/147 P |
| 4,484,185 | 11/1984 | Graves | 340/656 |
| 4,538,134 | 8/1985 | Carey | 337/113 |
| 5,320,563 | 6/1994 | Liao | 439/622 |
| 5,451,173 | 9/1995 | Mai | 439/622 |
| 5,590,010 | 12/1996 | Ceola et al. | 361/93 |
| 5,894,258 | 4/1999 | Chang | 337/255 |

OTHER PUBLICATIONS

*Article 210–Branch Circuits*, National Electrical Code; 1999 Edition; p. 70–41.

*Safety Devices, Ground Fault Circuit Interrupting Products*, Hubbell Wiring Device–Kellems; pp. G–30 and G–31.

*Brownlie Design*, Drawings; 3 Pages; Brownlie Design, Skaneateles, NY.

Thermal Cut–Offs (Thermal Links), p. 4, Overtemperature Protection For: Major and Small appliances, Personal Care Products, Heaters, Office Equipment.

*Primary Examiner*—Leo P. Picard
*Assistant Examiner*—Anatoly Vortman

[57] ABSTRACT

An electrical safety receptacle (10) including a dielectric housing (12), first electrical contacts (14) in the housing for electrical connection to one side of an electrical power line, second electrical contacts (16) in the housing for electrical connection to the other side of the electrical power line, and power-interruption members (48) provided as part of the second electrical contacts to interrupt the electrical power when an operating and/or environmental temperature exceeds the thermal rating thereof.

4 Claims, 5 Drawing Sheets

ELECTRICAL SAFETY RECEPTACLE

This Appln claims Benefit of Provisional Appln No. 60/118,229 filed Feb. 2, 1999.

FIELD OF THE INVENTION

The present invention relates to electrical receptacles and more particularly to electrical safety receptacles.

BACKGROUND OF THE INVENTION

In electrical circuits in homes and business buildings, circuit breakers or fuses at electrical panels from which the electrical circuits emanate are provided in order to disrupt electrical power when the electrical circuits are subjected to a short circuit or are overloaded. This will prevent the electrical circuits from overheating thereby preventing the possibility of starting a fire if the overheating continued. The shortcoming of this system is that intermittent circuit elements in series with an appliance electrically connected to an electrical receptacle in an electrical circuit, will increase intense local heating even though the increase in current caused by the heating will not blow a fuse or trip the circuit breaker. The increased heating may cause a fire especially in older homes in which the wood of the structural framework is very dry.

It therefore becomes extremely important to disrupt the electrical circuit at the electrical receptacle or other electrical receptacles controlled by the electrical receptacle to which they are electrically connected when an increase in temperature at the electrical receptacle takes place but does not draw sufficient current to blow the fuse or trip the circuit breaker of the electrical circuit in which the electrical receptacle is connected.

U.S. Pat. No. 4,538,134 discloses an electrical connector receptacle that includes a bimetallic thermostat connected between one of the electrical contacts that connects to an electrical receptacle and in series with the electrical contacts of each electrical outlet portion of the electrical connector receptacle so that when the temperature reaches a selected low temperature, e.g., 20° F., the bimetallic thermostat will be activated thereby operating a heating element. This constitutes a power actuation member and not a power interruption member due to increased temperature.

SUMMARY OF THE INVENTION

An object of the present invention is to provide an electrical receptacle that will cut off power at the receptacle if an abnormal heating condition occurs thereat anywhere in the electrical circuit.

The present invention is directed to an electrical safety receptacle including a dielectric housing, first electrical contacts disposed in the housing for electrical connection to one side of an electrical power line, second electrical contacts disposed in the housing for electrical connection to the other side of the electrical power line, and power interruption members provided as part of the second electrical contacts to interrupt the electrical power when an operating and/or environmental temperature exceeds the thermal rating of the power-interruption member at the electrical receptacle thereby causing at least one of the power interruption members to interrupt the electrical power to the electrical receptacle.

BRIEF DESCRIPTION OF THE DRAWINGS

Embodiments of the present invention will now be described by way of example with reference to the accompanying drawings in which.

DETAILED DESCRIPTION OF THE INVENTION

Figure 1:
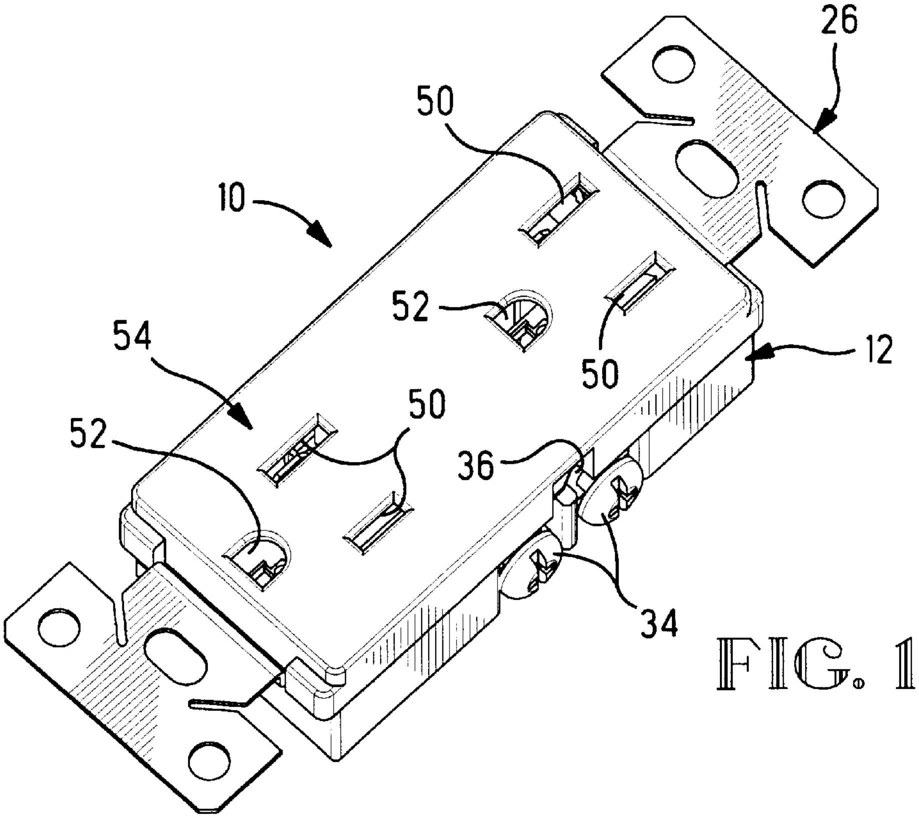
FIG. 1 is an isometric view of an electrical safety receptacle having fusable elements.
Figure 2:
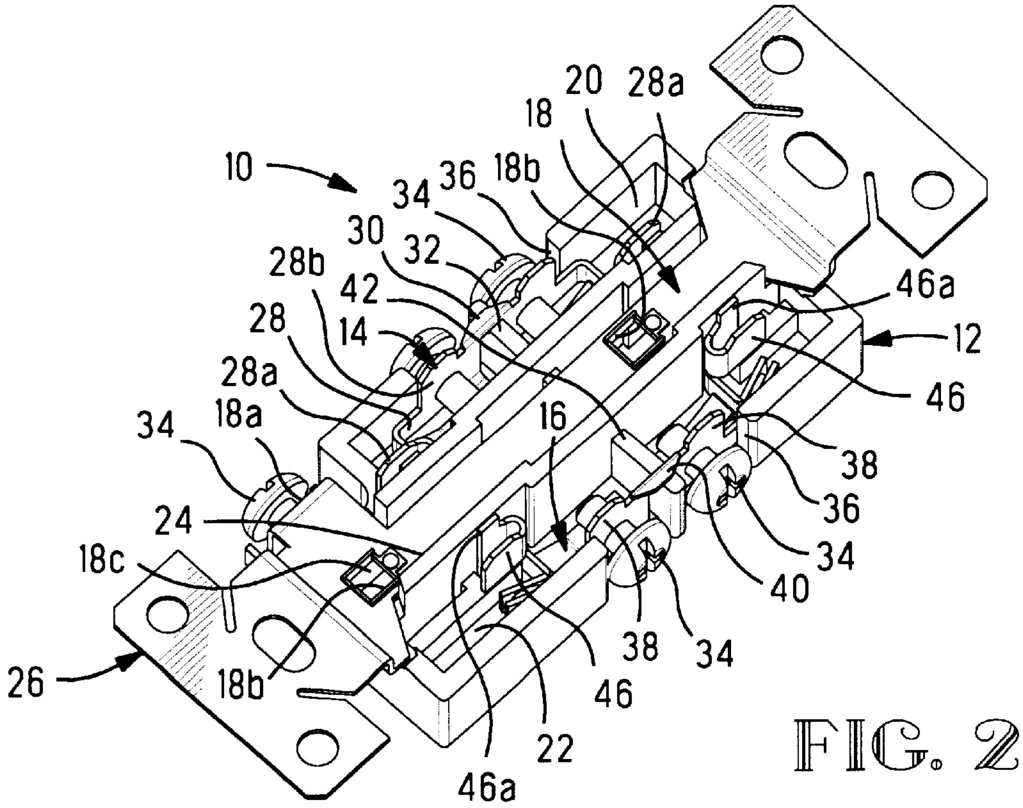
FIG. 2 is an isometric view of the electrical safety receptacle of FIG. 1 with a cover of the housing removed.
Figure 3:
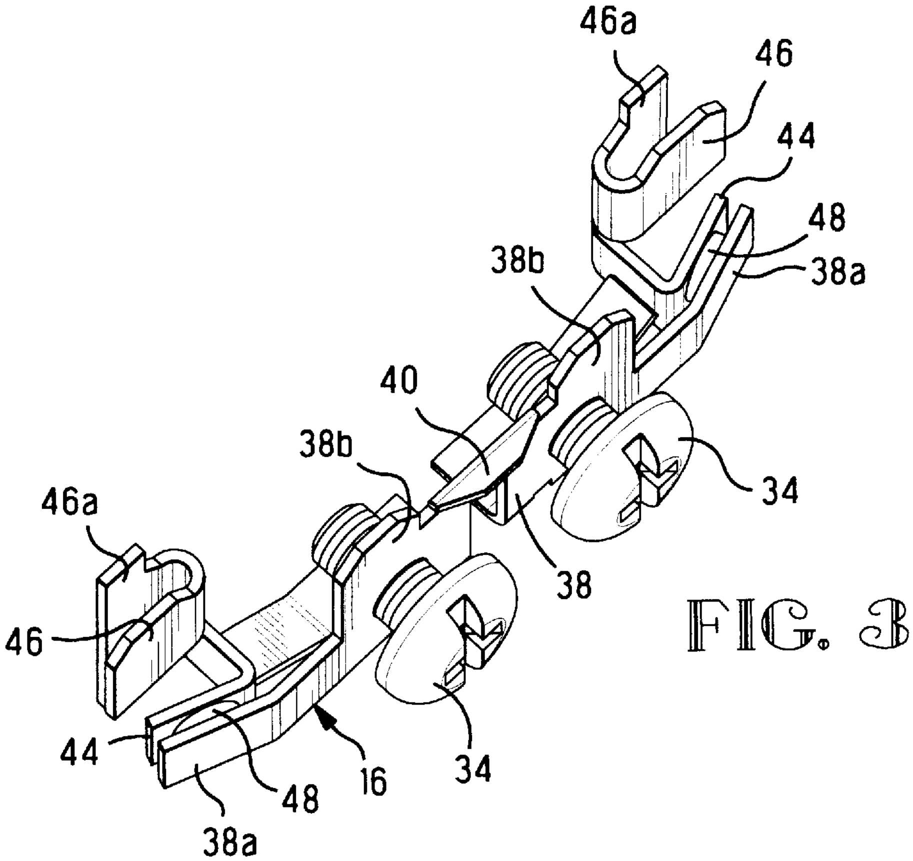
FIG. 3 is an isometric view of the electrical contact member that includes the fusable elements.

FIGS. 1–3 show electrical safety receptacle 10 which comprises a dielectric housing 12 in which are mounted a first electrical contact member 14, a second electrical contact member 16 and a ground contact member 18. Housing 12 includes compartment 20 in which the first electrical contact member 14 is mounted, compartment 22 in which the second electrical contact member 16 is mounted and compartment 24 disposed between compartments 20,22 in which a metal mounting bracket 26 is mounted and is a ground contact member 18.

First electrical contact member 14 includes linear sections 28 that are connected by a bridge member 30 straddling a projection 32 in compartment 20. A screw 34 is threadably mounted in each of linear sections 28. The screws 34 are located in an opening 36 in a side wall of housing 12. U-shaped electrical contacts 28*a* are located at outer ends of linear sections 28.

Second electrical contact member 16 includes linear sections 38 that are connected by a bridge member 40 straddling a projection 42 in compartment 22. Screws 34 are also threadably mounted in linear sections 38 and they are located in opening 36 in the other side wall of housing 12. Linear sections 38 have inwardly-bent sections 38*a* spaced from and parallel to inwardly-bent sections 44 of U-shaped electrical contacts 46. Fusable members 48 are located between inwardly-bent sections 38*a*,44 which are in the form of a heat-meltable metal such as a solder pellet that will melt at a specified temperature. First electrical contact member 14 will be electrically connected to the neutral wire of the electrical circuit, second electrical contact member 16 will be electrically connected to the hot wire of the electrical circuit and ground contact member 18 will be electrically connected to contact member 18*a* via screws 34.

Ground contact member 18 has square holes 18*b* and spring contacts 18*c* are mounted on the ground contact member 18 adjacent holes 18*b* which have opposing spring contact sections in alignment with the square holes. Thus, receptacle 10 has two electrical outlet portions each including electrical contacts 28*a*,46 and spring contact 18*c* which are aligned with respective slots 50 of different lengths and a D-shaped hole 52 of dielectric cover 54 secured on housing 12. The outlet portions are electrically connected together so long as bridges 30,40 are present. Each electrical outlet portion can be separated by removing bridges 30,40. Hence, it is necessary to have fusable members 48 for each electrical outlet portion in order to protect both of them, especially when they are separate. Projections 28*a*,28*b*,38*b*,46*a* are respectively provided at the upper ends of linear sections 28,38 and electrical contacts 28*a*,46 which are disposed in slots (not shown) in cover 54 so that contact members 14,16 are held in position in housing 12.

If an increase in temperature takes place at the receptacle 10, one or both of the fusable members 48 will melt if the required temperature is reached and flow from between the inwardly-bent sections 38*a*,44 thereby interrupting the electrical circuit connected to the electrical contact members 14,16. If the outlet portions have been separated, the outlet portion that is being used will be affected if arcing occurs thereby melting the fusable member 48 if the required temperature is reached, whereby the circuit will be interrupted.

FIGS. 4–9 show alternative embodiments of the electrical contact member containing the circuit-interrupting members which can be used in place of contact member 16. In the case of electrical contact member 66 of FIG. 4, spring contacts 68 have one end secured to inwardly-bent sections 70 of linear sections 72 while the other end is secured to sections 74 of electrical contacts 76 by fusable rivets 78 which are made of heat-meltable material as that of fusable members 48. Thus, when an increase in temperature occurs at the receptacle, fusable rivets 78 will melt causing spring contacts 68 to disconnect from sections 74 thereby interrupting the electrical circuit.

Figure 4:
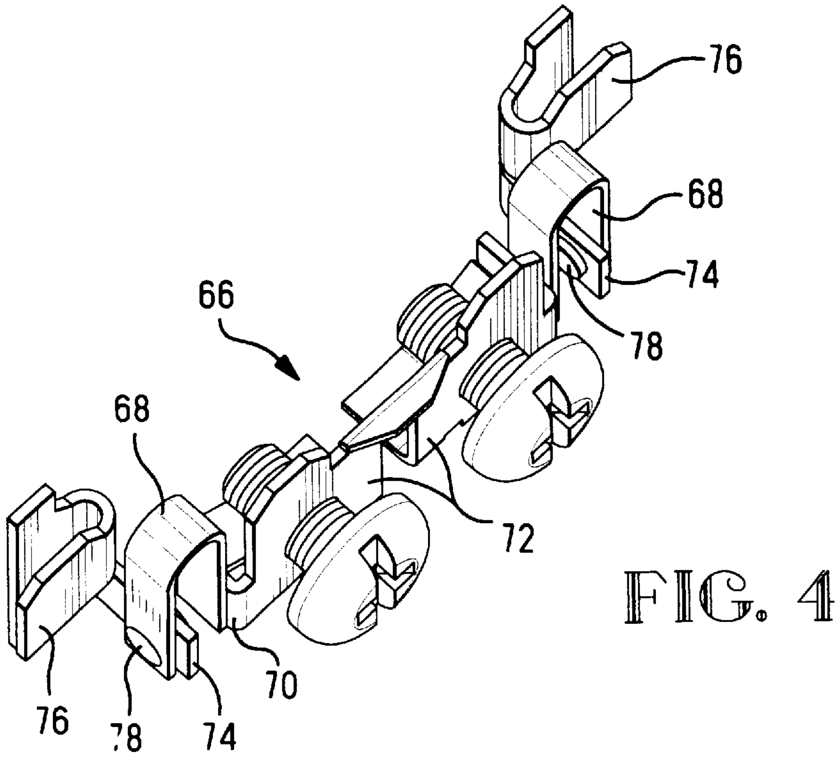
FIG. 4 is an isometric view of the electrical contact member that includes fusable rivets.
Figure 5:
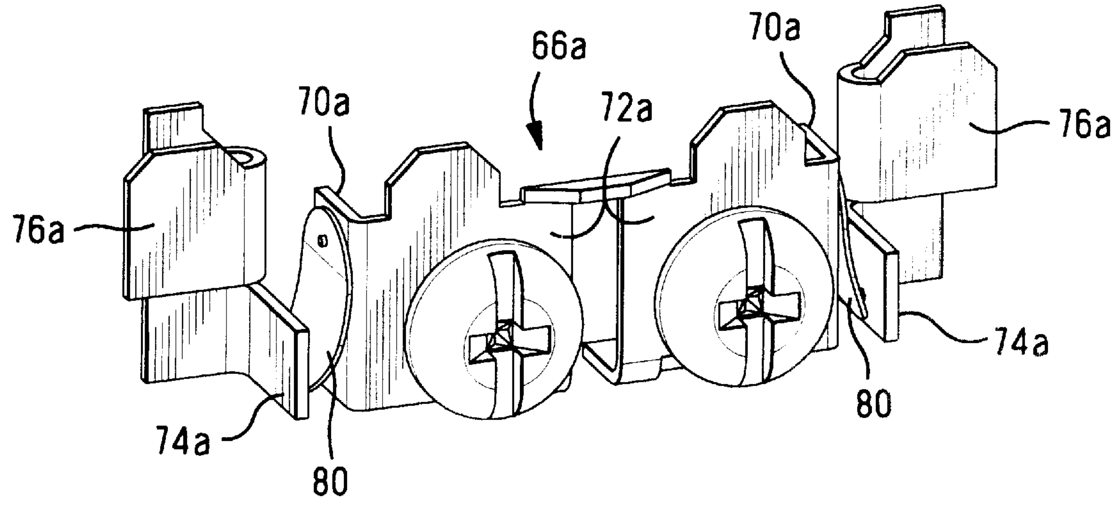
FIG. 5 is an isometric view of the electrical contact member that includes bimetallic strips.

The electrical contact member 66*a* of FIG. 5 is essentially the same as the embodiment of FIG. 4 except that bimetallic strips 80 are connected to inwardly-bent sections 70*a* of linear sections 72*a* and they are normally electrically engaged with sections 74*a* of electrical contacts 76*a*. Thus, when an increase in temperature occurs at the receptacle, bimetallic strips 80 are disengaged from sections 74*a* thereby interrupting the electrical circuit.

Figure 6:
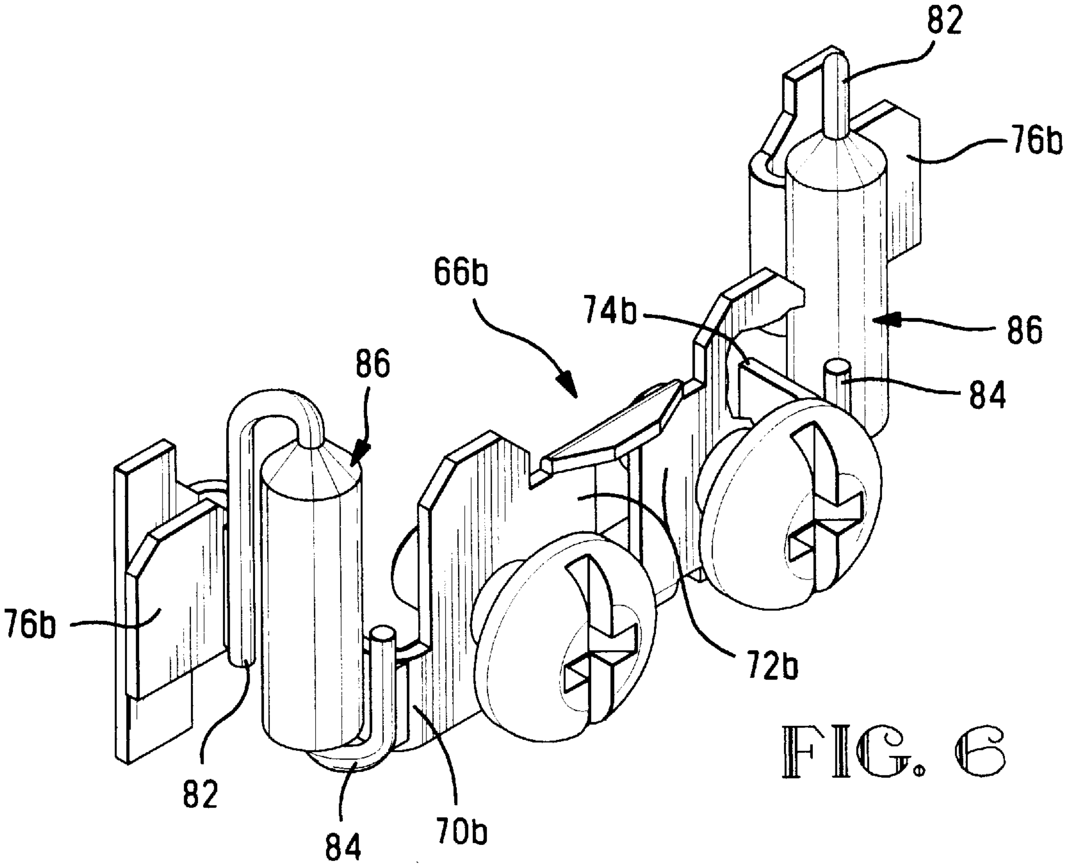
FIG. 6 is an isometric view of the electrical contact member that includes thermal cut-off members.
Figure 7:
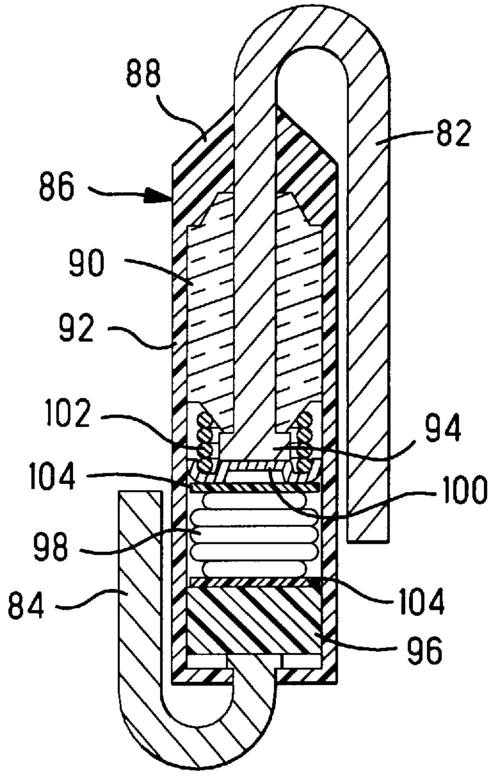
FIGS. 7 and 8 are cross-sectional views showing the thermal cut-off member in operative and inoperative positions.

The electrical contact member 66*b* of FIG. 6 has electrical leads 82,84 of thermal cut-off members 86 electrically connected to sections 74*b* of electrical contacts 76*b* and inwardly-bent sections 70*b* of linear sections 72*b*. FIG. 7 shows the thermal cut-off member 86 in its normal position wherein electrical lead 82 extends through a sealing resin 88 and a ceramic bushing 90 as part of metal housing 92 and terminates as a stationary contact 94. An organic pellet 96 is located between a contact end of electrical lead 84 disposed within metal housing 92 and an outer end of a barrel spring 98. An inner end of the barrel spring 98 engages a movable contact 100 and forces it into electrical engagement with stationary contact 94 so that electrical leads 82,84 are electrically connected via contact 94, housing 92 and the contact end of lead 84. A trip spring 102 extends between ceramic bushing 90 and movable contact 100. Dielectric discs 104 are located between movable contact 100 and spring 98 and between spring 98 and pellet 96.

Figure 8:
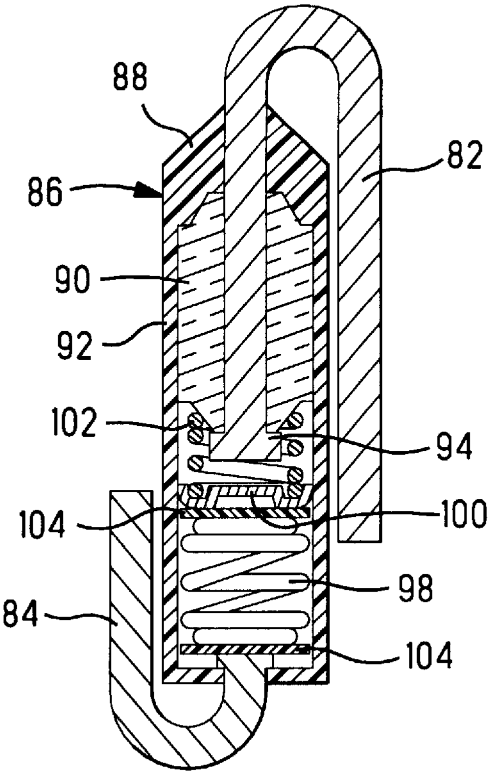

The thermal cut-off members 86 respond to temperature by interrupting the electrical circuit when the operating and/or environmental temperature exceeds the thermal rating of the thermal cut-off members. This occurs when the organic pellet 96 experiences a phase change thereby allowing the spring-activated contact to open the electrical circuit as shown in FIG. 8. Thus, trip spring 102 has a greater spring force than barrel spring 98.

Figure 10:
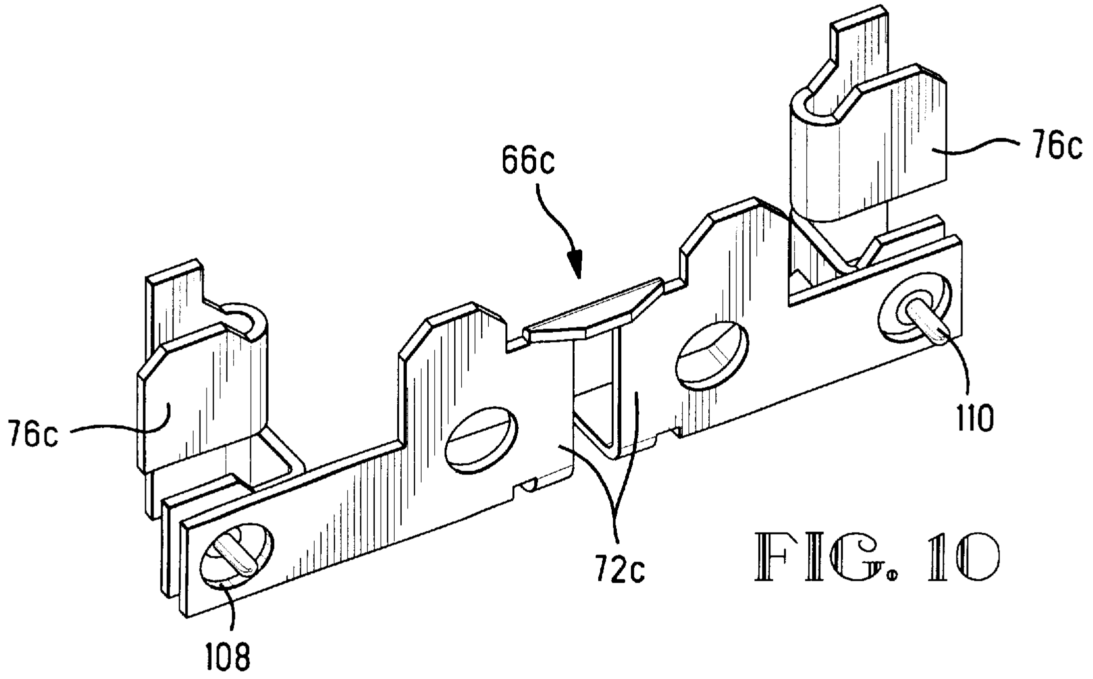
FIG. 10 is an isometric view of the electrical contact member of FIG. 9.
Figure 9:
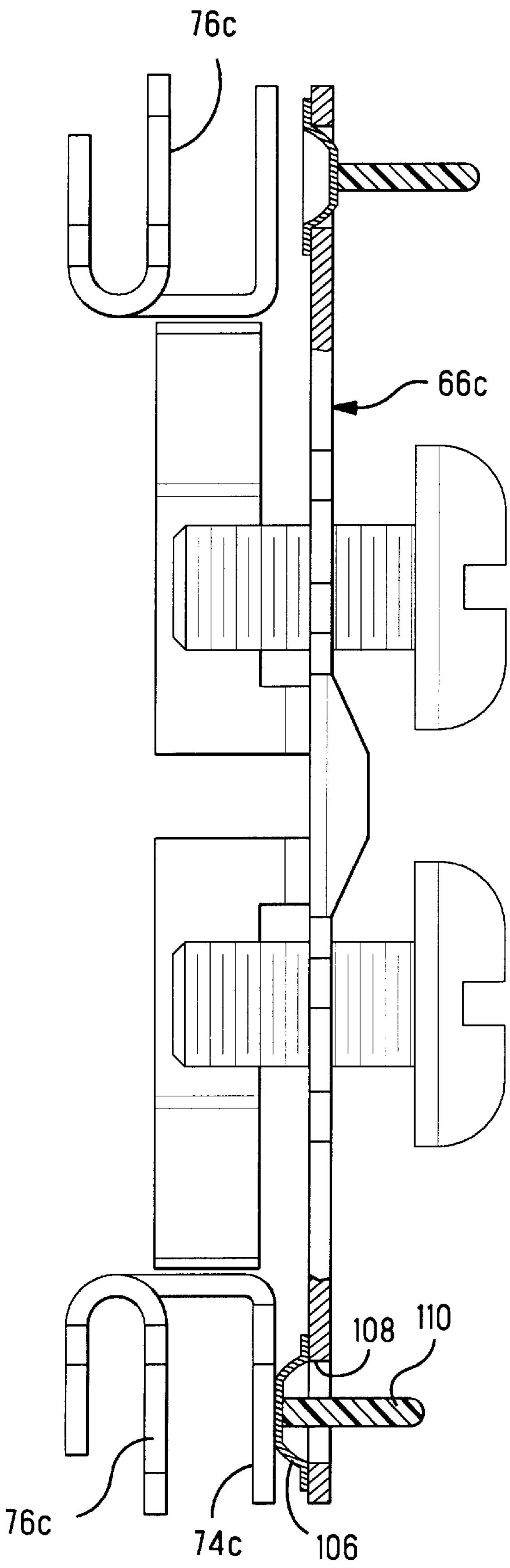
FIG. 9 is a top plan view partly in cross-section of the electrical contact member that includes bimetallic domes.

The electrical contact member 66*c* of FIGS. 9 and 10 has dome-shaped bimetallic members 106 mounted on linear sections 72*c* around holes 108 thereof. Dielectric rods 110 are secured at the center of dome-shaped bimetallic members 106 and extend through holes 108. Dome-shaped bimetallic members 106 are normally electrically engaged with sections 74*c* of electrical contacts 76*c*, but, when the operating and/or environmental temperature exceeds the thermal rating of the dome-shaped bimetallic domes 106, they will disengage from sections 74*c* thereby interrupting the electrical circuit. Upon cooling, a push on dielectric rods 110 will reset the dome-shaped bimetallic members to reconnect linear sections 72*c* with sections 74*c*.

As can be discerned, embodiments of the electrical safety receptacle have been described which will interrupt the electrical circuit when the operating and/or environmental temperature exceeds the thermal rating of the power-interruption members.

What is claimed is:

1. An electrical safety receptacle comprising a dielectric housing;

a first electrical contact member disposed in the housing for electrical connection to one side of an electrical power line;

a second electrical contact member disposed in the housing for electrical connection to the other side of the electrical power line, the second electrical contact member including a pair of linear sections connected together by a bridge member, and a pair of electrical contacts each associated with one of the linear sections; and a pair of power-interruption members each connected between one of the linear sections and its associated said electrical contact, wherein electrical power through at least a portion of the second electrical contact member is interrupted when an operating and/or environmental temperature exceeds the thermal rating of one of the power-interruption members.

2. An electrical safety receptacle comprising:

a dielectric housing;

a first electrical contact member disposed in the housing for electrical connection to one side of an electrical power line;

a second electrical contact member disposed in the housing for electrical connection to the other side of the electrical power line, the second electrical contact member including a linear section and an electrical contact; and a power-interruption member connected between the linear section and the electrical contact, the power interruption member including a spring contact having one end connected by a fusable rivet to one of the linear section and the electrical contact, wherein electrical power through the second electrical contact member is interrupted when an operating and/or environmental temperature exceeds a thermal rating of the power-interruption member.

3. An electrical safety receptacle comprising:

a dielectric housing;

a first electrical contact member disposed in the housing for electrical connection to one side of an electrical power line;

a second electrical contact member disposed in the housing for electrical connection to the other side of the electrical power line, the second electrical contact member including a linear section and an electrical contact; and a power-interruption member connected between the linear section and the electrical contact, the power interruption member including a dome-shaped bi-metallic member, wherein electrical power through the second electrical contact member is interrupted when an operating and/or environmental temperature exceeds a thermal rating of the power-interruption member.

4. The electrical safety receptacle of claim 3, wherein the dome-shaped bi-metallic member surrounds a hole in the linear section, and a dielectric rod mounted on the dome-shaped bi-metallic member extends through the hole.

* * * * *